(12) United States Patent
Coppin

(10) Patent No.: US 7,929,919 B2
(45) Date of Patent: Apr. 19, 2011

(54) SYSTEMS AND METHODS FOR A PLL-ADJUSTED REFERENCE CLOCK

(75) Inventor: Justin Coppin, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 134 days.

(21) Appl. No.: 12/237,869

(22) Filed: Sep. 25, 2008

(65) Prior Publication Data

US 2010/0074388 A1 Mar. 25, 2010

Related U.S. Application Data

(60) Provisional application No. 61/053,385, filed on May 15, 2008.

(51) Int. Cl.
*H04B 1/40* (2006.01)
*H04B 7/00* (2006.01)
*H04L 7/00* (2006.01)

(52) U.S. Cl. .......... 455/76; 455/260; 331/172; 375/371; 375/376

(58) Field of Classification Search .................. 331/172; 375/371, 376; 455/76, 260
See application file for complete search history.

(56) References Cited

U.S. PATENT DOCUMENTS

| | | | |
|---|---|---|---|
| 6,714,765 B1 * | 3/2004 | Kimppa | 455/76 |
| 7,656,323 B2 * | 2/2010 | Bereza et al. | 341/100 |
| 2004/0053595 A1 * | 3/2004 | Shinbo et al. | 455/316 |
| 2009/0156149 A1 * | 6/2009 | Plevridis et al. | 455/260 |

* cited by examiner

*Primary Examiner* — Robert Pascal
*Assistant Examiner* — Levi Gannon

(57) ABSTRACT

A system is provided, the system includes a phase-locked loop (PLL) that multiplies a reference clock input to generate a communication link clock signal. The system also includes a transmitter/receiver (TX/RX) module coupled to the PLL, the TX/RX module is configured to transmit and receive data based on the communication link clock signal. The system also includes a divider coupled to the PLL, the divider receives the communication link clock signal and outputs a PLL-adjusted reference clock that approximates the reference clock input. The PLL-adjusted reference clock is used to generate at least one other communication link clock signal.

15 Claims, 2 Drawing Sheets

SYSTEMS AND METHODS FOR A PLL-ADJUSTED REFERENCE CLOCK

CROSS REFERENCE TO RELATED APPLICATIONS

This application claims the benefit of U.S. Provisional Application Ser. No. 61/053,385, filed May 15, 2008, titled "SYSTEMS AND METHODS FOR A PLL-ADJUSTED REFERENCE CLOCK" which is hereby incorporated by reference herein as if reproduced in full below.

BACKGROUND

Computer bus architectures have evolved over time to provide increasing amounts of bandwidth for communications between computer components. For example, in the 1980's, the Industry Standard Architecture (ISA) bus provided a 16-bit interface operated at 8 MHz. Eventually, the ISA bus was replaced or enhanced by other bus architectures such as the Microchannel (MCA) bus, the Extended ISA (EISA) bus, and the Video Electronics Standards Association (VESA) Local Bus (VL-bus). To further improve bandwidth, the Peripheral Component Interconnect (PCI) architecture was developed to provide a 32-bit interface operated at 33 MHz. PCI Express (PCIe) is now being widely implemented between communication links in servers or personal computers. The PCI Special Interest Group (PCI-SIG) has recently released the updated PCI Express 2.0 Specification, which supports data transfer rates of 5 gigatransfers/second, where every eight bits are encoded into a 10-bit symbol (8 b/10 b encoding).

As data transfer rates increase to 5 gigatransfers/second and beyond, various design requirements need to be met to ensure successful communication. One of these design requirements is the synchronization of clocks for paired transmitter (TX) and receiver (RX) communication links. Rather than require perfect synchronization, bus architectures such as PCI Express 2.0 specify various design budgets including a clock jitter budget. Other examples of design budgets include thresholds for printed circuit board (PCB) trace characteristics and the distance between communication links.

It is known that some clock-jitter is due to imperfections, thermal noise and/or differences in the design of Phase-Locked Loops (PLLs), which are used by communication links to increase a reference clock signal (e.g., 100 MHz) to a desired communication link clock signal (e.g., 5 GHz). Efforts to improve the design of PLLs or to otherwise reduce clock jitter are being made.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to high-speed communication links, where paired transmitter (TX) and the receiver (RX) clocks are synchronized at least to a minimum synchronization level. The minimum synchronization level can be determined based on various budgets such as a Phase-Locked Loop (PLL) jitter budget, a communication link spacing budget, and a printed circuit board (PCB) trace performance budget. In accordance with embodiments, paired communication links are configured to share the output of a PLL, which reduces or eliminates the need for the PLL jitter budget. If desired, some or all of the PLL jitter budget can be reallocated to extend other budgets.

Figure 1:
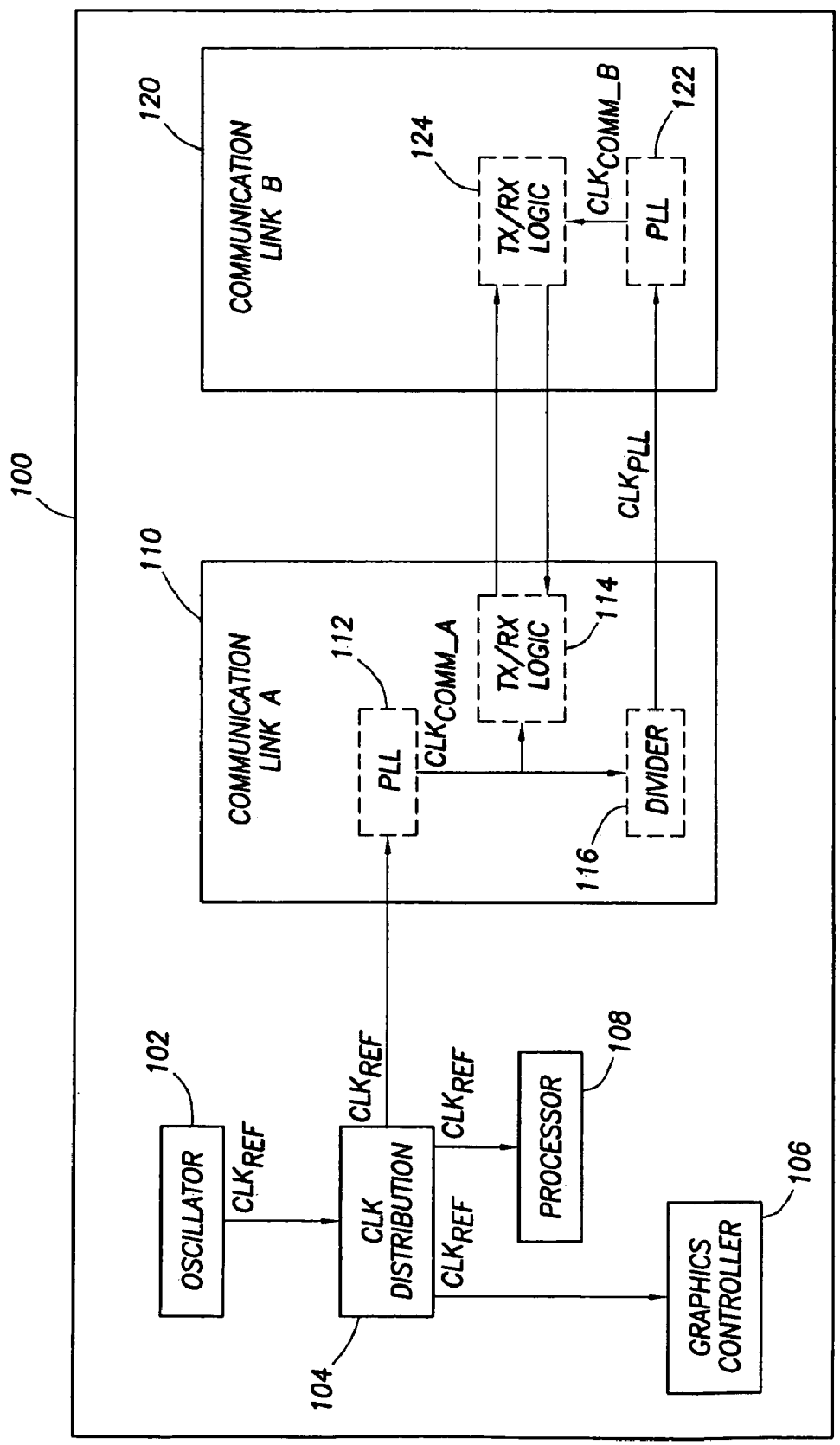
FIG. 1 illustrates a system in accordance with embodiments of the disclosure.

FIG. 1 illustrates a system 100 in accordance with embodiments of the disclosure. As shown, the system 100 comprises an oscillator 102 (e.g., a crystal oscillator) that outputs a reference clock ($CLK_{ref}$). As an example, $CLK_{ref}$ may comprise a 100 MHz signal. $CLK_{ref}$ is then input to a clock distribution module 104 that distributes (e.g., by "fan-out") $CLK_{ref}$ to various components of the system 100. As shown, $CLK_{ref}$ may be provided to a processor 108 (e.g., a CPU), a graphics controller 106 and a communication link A 110. In alternative embodiments, additional or fewer components may receive $CLK_{ref}$. Moreover, in alternative embodiments, the communication link A 110 may receive $CLK_{ref}$ directly from the oscillator 102, or from another component, instead of receiving $CLK_{ref}$ from the clock distribution module 104.

At the communication link A 110, $CLK_{ref}$ is input to a PLL 112, which multiplies $CLK_{ref}$ to generate a communication link clock signal ($CLK_{comm\_A}$). For example, if the communication link A 110 represents a PCI Express communication link, $CLK_{comm\_A}$ may be a 2.5 GHz clock signal (version 1.1) or a 5 GHz clock signal (version 2.0). $CLK_{comm\_A}$ is then forwarded to transmit/receive (TX/RX) logic 114, which enables the communication link A 110 to transmit data to and receive data from a communication link B 120 paired with the communication link A 110. In at least some embodiments, the TX/RX logic 114 comprises hardware, firmware, and/or software to support communications in accordance with PCI Express. In alternative embodiments, the TX/RX logic 114 supports another communication protocol now known or later developed.

$CLK_{comm\_A}$ is also forwarded to a divider 116, which outputs a PLL-adjusted reference clock ($CLK_{PLL}$). In other words, $CLK_{PLL}$ maintains some or all of the jitter characteristics caused by the PLL 112. In FIG. 1, the divider 116 is shown to be part of the communication link A 110. Alternatively, the divider 116 may be external to the communication link A 110. In other words, in various embodiments, the communication link A 110 may output the signal $CLK_{comm\_A}$, the signal $CLK_{PLL}$, or both. Further, the communication link A 110 incorporates at least one additional output pin for each of $CLK_{comm\_A}$ and/or $CLK_{PLL}$. In embodiments where $CLK_{comm\_A}$ or $CLK_{PLL}$ are differential clock signals, the communication link A 110 package provides two output pins for each of $CLK_{comm\_A}$ and/or $CLK_{PLL}$. Regardless of where the divider 116 is located, the communication link B 120 receives $CLK_{PLL}$.

As previously mentioned, $CLK_{PLL}$ preserves some or all of the jitter characteristics introduced by the PLL 112. Further, $CLK_{PLL}$ can approximate $CLK_{ref}$ with regard to frequency and magnitude. In such embodiments, the amount by which the PLL 112 multiplies $CLK_{ref}$ to generate $CLK_{comm\_A}$ is approximately the same as the amount by which the divider 116 divides $CLK_{comm\_A}$ to generate $CLK_{PLL}$. In alternative embodiments, $CLK_{PLL}$ can differ from $CLK_{ref}$ as long as the communication link B 120 is able to generate an appropriate communication link clock signal ($CLK_{comm\_B}$) based on $CLK_{PLL}$. In either case, $CLK_{comm\_A}$ and $CLK_{comm\_B}$ should be synchronized at least to a minimum synchronization level specified by the communication link protocol being used.

In FIG. 1, a PLL 122 of the communication link B 120 generates $CLK_{comm\_B}$ by multiplying $CLK_{PLL}$ by an appropriate value. $CLK_{comm\_B}$ is then provided to TX/RX logic 124, which enables the communication link B 120 to transmit data to and receive data from the communication link A 110. Similar to the TX/RX logic 114 of the communication link A 110, the TX/RX logic 124 may comprise hardware, firmware, and/or software to support communications in accordance with PCI Express or another communication protocol now known or later developed. Regardless of the communication protocol, the TX/RX logic 114 of the communication link A 110 and the TX/RX logic 124 of the communication link B 120 should be compatible and synchronized at least to a minimum synchronization level.

Although only one pair of communication links is shown in FIG. 1, it should be understood that the system of FIG. 1 may have a plurality of paired communication links. For each pair, one of the communication links receives a $CLK_{PLL}$ (a PLL-adjusted reference clock) from the other communication link. Further, a set of communication links may receive a $CLK_{PLL}$ based on the PLL output of a "base" communication link, which acts as a "root complex" for the set.

Figure 2:
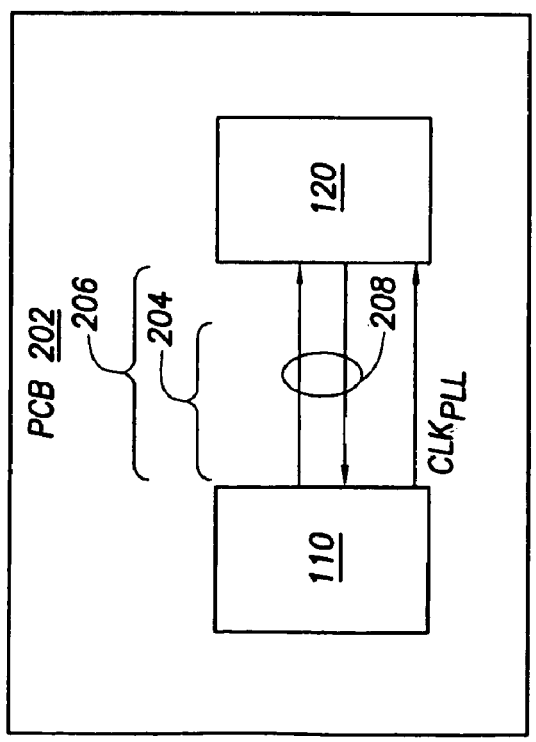
FIG. 2 illustrates various system features in accordance with embodiments of the disclosure.

FIG. 2 illustrates various system features in accordance with embodiments of the disclosure. In FIG. 2, the communication link A 110 and the communication link B 120 are mounted to a PCB 202. As shown, the communication link B 120 receives a $CLK_{PLL}$ from the communication link A 110. In other words, the paired communication links A and B are configured to share the output of communication link A's PLL as previously described, which reduces or eliminates the need for the PLL jitter budget.

In at least some embodiments, some or all of the PLL jitter budget specified by the communication link protocol (e.g., PCI Express 2.0) can be reallocated to extend other budgets. For example, in FIG. 2, the space 204 represents a maximum spacing budget specified by the communication link protocol. In accordance with embodiments, the communication links A and B are separated by a space 206 greater than space 204 because the PLL jitter budget has been reallocated to extend the maximum spacing budget. With the space 206, the design and implementation of the communication links A and B in a system have greater flexibility.

Additionally or alternatively, communication link traces 208 should follow a minimum trace performance budget (e.g., resistance, capacitance) specified by the communication link protocol. In accordance with embodiments, the communication link traces 208 do not meet the requirements of the minimum trace performance budget because the PLL jitter budget has been reallocated to extend the minimum trace performance budget. Thus, the PCB 202 and/or the traces 208 can be manufactured from cheaper materials providing cost savings. As understood by those of skill in the art, the values for the PLL jitter budget, the maximum spacing budget and the minimum trace performance budget can be adjusted as long as the communication links are able to successfully exchange data. Thus, stricter compliance in one or more budgets may extend (relax) the requirements for at least one other budget.

Figure 3:
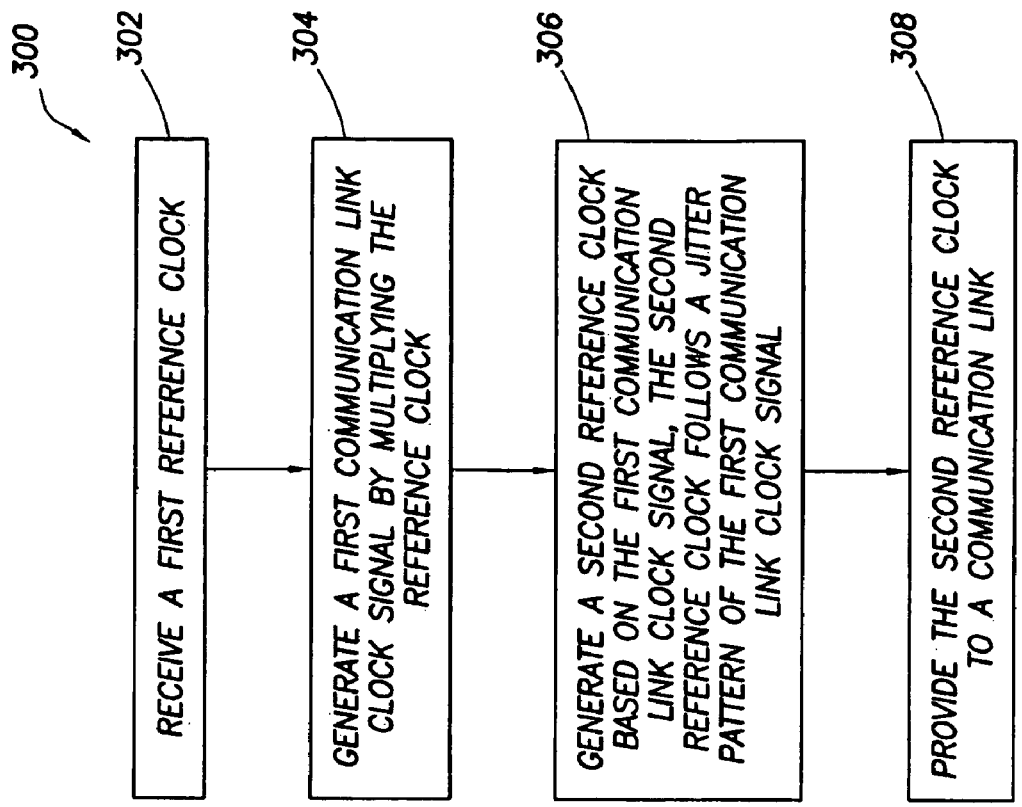
FIG. 3 illustrates a method in accordance with embodiments of the disclosure.

FIG. 3 illustrates a method 300 in accordance with embodiments. As shown, the method 300 comprises receiving a first reference clock (block 302). At block 304, a first communication link clock signal is generated by multiplying the first reference clock. At block 306, a second reference clock is generated based on the communication link clock signal, the second reference clock follows a jitter pattern of the communication link clock signal. At block 308, the second reference clock is provided to a communication link.

In at least some embodiments, the method 300 further comprises dividing the first communication link clock signal by a factor that enables the second reference clock to approximate a frequency of the first reference clock. The method 300 may also comprise generating a second communication link clock signal based on the second reference clock. The method 300 may also comprise exchanging data between communication links based on the first and second communication link clock signals.

As disclosed herein, an upstream device's PLL generates the reference clock of a downstream device (e.g., in a PCI Express application). This feature provides benefits similar to forwarded clock architectures (e.g., AMD's HyperTransport), where a high-speed clock is sent with the data. However, embodiments do not rely on a dedicated full-speed clock and, instead, change how the reference clock for a downstream device is generated.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a phase-locked loop (PLL) that multiplies a reference clock input to generate a communication link clock signal;
   a transmitter/receiver (TX/RX) module coupled to the PLL, the TX/RX module is configured to transmit and receive data based on the communication link clock signal; and
   a divider coupled to the PLL, the divider receives the communication link clock signal and outputs a PLL-adjusted reference clock that approximates the reference clock input, wherein the PLL-adjusted reference clock is used to generate at least one other communication link clock signal.

2. The system of claim 1 wherein the PLL and the TX/RX module are components of a serial communication link.

3. The system of claim 2 wherein the divider is a component of the serial communication link.

4. The system of claim 2 wherein the serial communication link comprises a root complex.

5. The system of claim 1 wherein the TX/RX module and the communication link clock signal are compatible with PCI Express.

6. The system of claim 1 further comprising at least one serial communication link that receives the PLL-adjusted reference clock and generates a corresponding communication link clock signal.

7. An electronic device, comprising:
   first and second communication links configured to exchange data; and
   a reference clock generator that outputs a reference clock to the first communication link, wherein the first communication link multiplies the reference clock for use as a communication link clock signal and wherein the first communication link divides the communication link clock signal to generate a jitter-matched reference clock for use by the second communication link.

8. The electronic device of claim 7 further comprising a printed circuit board (PCB) upon which the first and second communication links are mounted.

9. The electronic device of claim 8 wherein the jitter-matched reference clock enables a PCB spacing between the first and second communication links to be greater than a predetermined spacing budget for communication links.

10. The electronic device of claim 8 wherein the jitter-matched reference clock enables a PCB trace performance between the first and second communication links to be less than a predetermined trace performance budget for communication links.

11. The electronic device of claim 7 wherein the first and second communication links comprise Peripheral Communication Interface (PCI) Express links.

12. A method performed by a first communication link, comprising:
    receiving a first reference clock;
    generating a first communication link clock signal by multiplying the first reference clock;
    generating a second reference clock based on the communication link clock signal, the second reference clock follows a jitter pattern of the first communication link clock signal; and
    providing the second reference clock to a second communication link to generate a second communication link clock signal for the second communication link.

13. The method of claim 12 wherein generating the second reference clock comprises dividing the communication link clock signal by a factor that enables the second reference clock to approximate a frequency of the first reference clock.

14. The method of claim 12 further comprising generating the second communication link clock signal based on the second reference clock.

15. The method of claim 14 further comprising exchanging data between communication links based on the first and second communication link clock signals.

* * * * *